Figure 4:
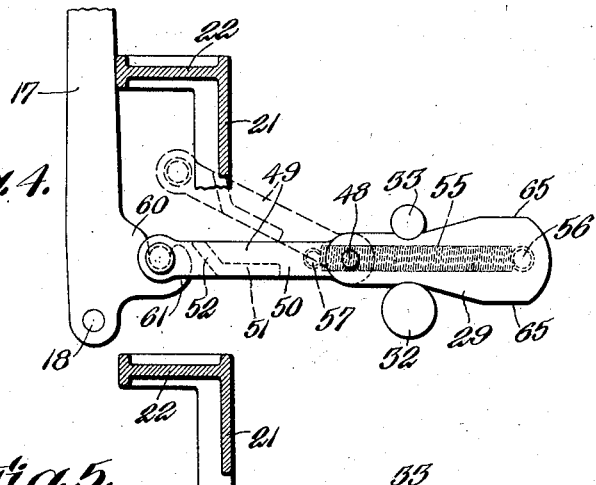

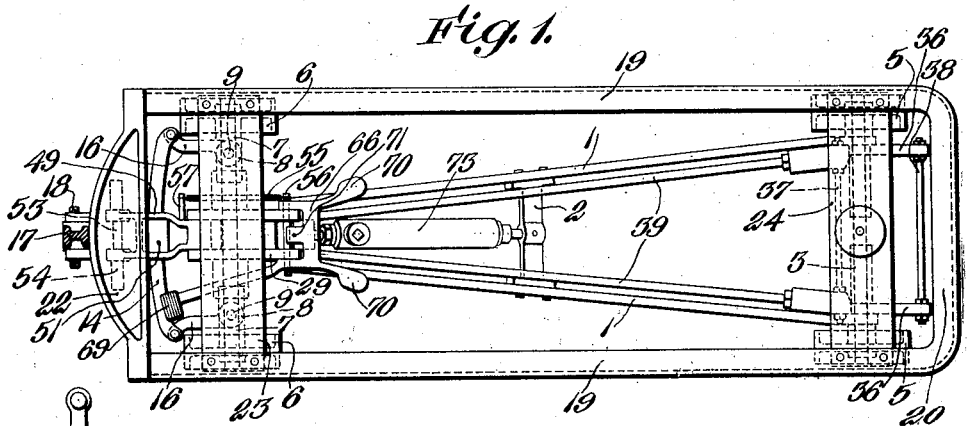
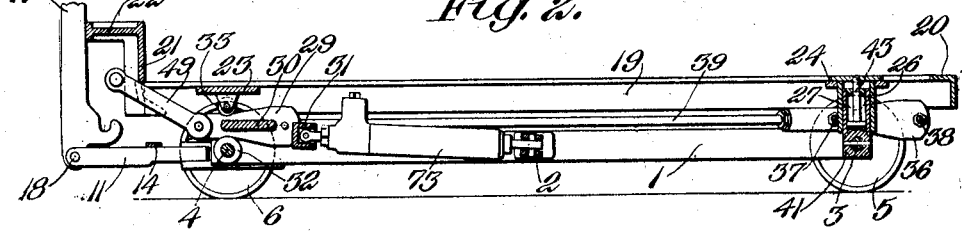
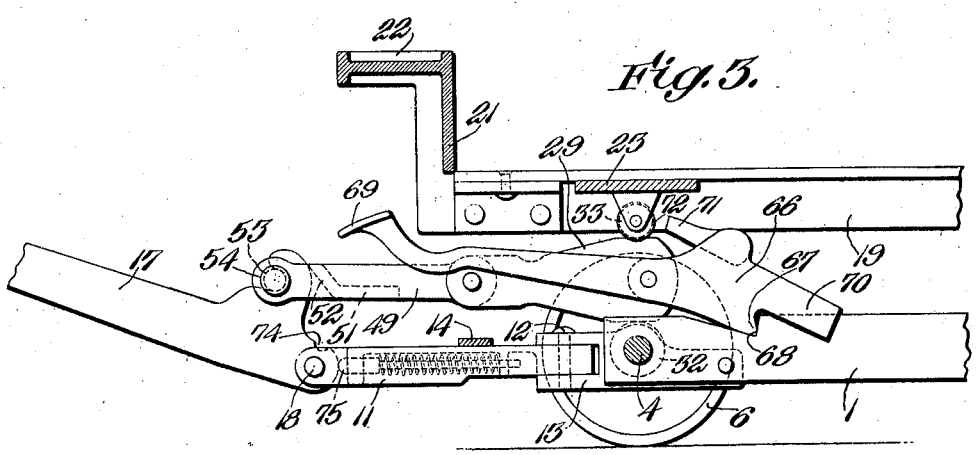

March 13, 1928.  B. E. SCRIVEN  1,662,782

ELEVATING TRUCK

Filed March 15, 1923  2 Sheets-Sheet 2

Inventor:
Bernard E. Scriven
by his attorneys

Patented Mar. 13, 1928.

1,662,782

UNITED STATES PATENT OFFICE.

BERNARD E. SCRIVEN, OF SOUND BEACH, CONNECTICUT, ASSIGNOR TO THE EXCELSIOR PLIMTRUCK CO., OF STAMFORD, CONNECTICUT, A CORPORATION OF CONNECTICUT.

ELEVATING TRUCK.

Application filed March 15, 1923. Serial No. 625,391.

The present invention relates to that class of trucks in which the load is supported on a vertically movable table or body which may be raised to transfer the load to the truck and which may be lowered to transfer the load from the truck to another support.

The object of the present invention is to improve and simplify the mechanism for raising and lowering the body or table and more particularly shown and described in my prior Patent No. 1,338,255, dated April 27, 1920. To the above end the present invention consists of the features of construction and combination of parts hereinafter described and more particularly described in the claims.

In the accompanying drawings which illustrate what is now considered the preferred form of the present invention, Fig. 1 is a top plan view and Fig. 2 a vertical, longitudinal section of a truck of the general construction shown in my prior patent, and provided with my improved elevating and lowering mechanism; Fig. 3 is a vertical, longitudinal sectional view, on an enlarged scale, of the front end of my improved truck, and Figs. 4, 5, 6 and 7 are side views, partially in section, showing somewhat diagrammatically the manner of operation of the elevating mechanism.

The general construction of the illustrated elevating truck, so far as the running gear, elevating mechanism and truck body are concerned, is similar to that shown in my prior Patent No. 1,338,255, dated April 27, 1920. Briefly, this comprises an A-shaped frame formed by the obliquely arranged side members 1 and cross-member 2. The side members are supported at the ends upon the rear axle 3 and at their front ends upon the rigid front axle 4. The rear wheels 5 are mounted upon the ends of the rear axle 3, while the front wheels 6 are mounted upon short axles 7, 7, carried by steering knuckles 8, 8, mounted to turn upon the vertical pivots 9, 9, in the yokes at the ends of the front axle 4, all as shown and described in said prior patent.

The steering knuckles are turned by means of a tongue 11 mounted in the slot or recess in the block 13 secured to the front axle 4 at its middle, the tongue turning upon a vertical pivot pin 12. The links 14 connect the tongue with the arms 16 which extend forwardly from the steering knuckles. The tongue 11 is swung to the right and to the left to guide the truck by means of the guiding handle 17 mounted upon the horizontal pivot 18 at the front end of the tongue 11.

The vertically movable table or body of the truck comprises an open frame having the side members 19 and the rear member 20 of angle iron. The side members are connected at their front ends by a vertical member 21 having the forwardly extending horizontal portion 22.

The cross-members 23 and 24 directly above the front and rear axles respectively are secured to the side members of the frame. The table or body is guided in its upward and downward movements as set forth in detail in said prior patent, suitable guiding devices at their rear end being shown as a hollow cylindrical boss 26 extending downwardly from the cross-member 24, the boss sliding upon an upwardly extending cylindrical member 27 fixed upon the rear axle 3.

The mechanism for raising and lowering the table or body as shown in said patent, comprises four wedges having inclined upper and lower edges and adapted to be moved longitudinally between anti-friction rollers carried by the axles and table. The two front wedges 29 are formed integrally with the cross-members 30 and 31, and are arranged to move with their lower edges supported upon the rollers 32, which are rotatably mounted upon the front axle, and with their upper edges in engagement with the rolls 33 rotatably supported upon the front cross-member 23.

The rear wedges 36 are connected together at their front and rear ends by cross-rods 37 and 38. The front and rear wedges are connected by means of oblique rods 39. The lower edges of the rear wedges are supported upon the anti-friction rolls 41 mounted upon the rear axle 3, while the upper edges of the wedges engage the rolls 43 upon the cross-member 24.

The truck body or table is elevated in my improved truck, as it is in my prior patent by moving the wedges longitudinally by means of the guiding handle. In the present invention the mechanism for connecting the elevating wedge mechanism with the handle is improved and simplified and operates, so far as connection and disconnection are concerned, in a different manner.

Figure 5:
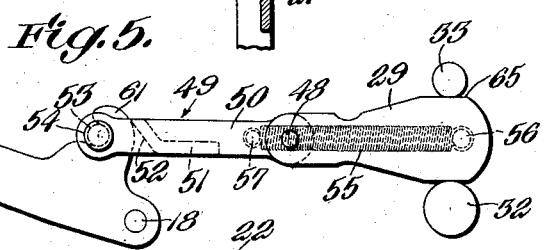
Figure 7:
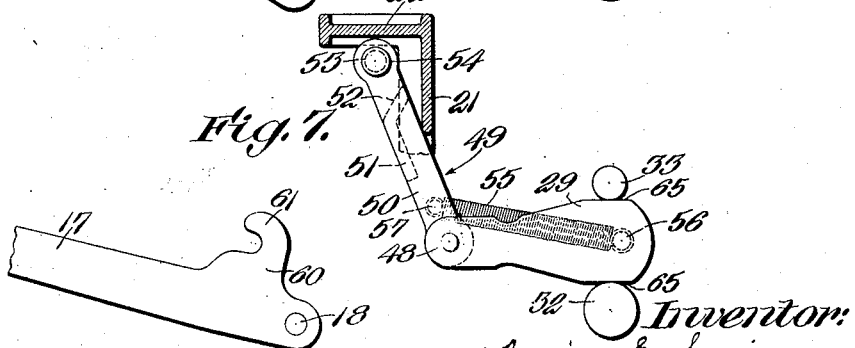

Pivoted at 48 at the forward end of the front wedges is a link 49 comprising side members 50 connected by the cross-members or web 51 having the inclined face 52. Extending between the front ends of the side bars of the link 49 is the bar 53 having the lateral extensions 54. A tension spring 55 is connected at its rear end to the rod 56, which passes through the rear ends of the front wedges. The spring is connected at its front end to an arm 57 projecting from the side of the link 49. When the link and front wedges are in a line, as shown in Fig. 5, so that the line of action of the spring is through or close to the pivot 48, the spring is without effect. When, however, the front end of the link is raised so that the line of action of the spring lies a sufficient distance above the pivot 48, then the spring becomes operative to raise the link higher and hold it in elevated position as shown in Figs. 2, 4 and 7. When the table is in lowered position, as shown in Figs. 2 and 4, the link engages the vertical portion 21 of the table which serves as an abutment to prevent the link from rising further, thus holding the lateral extensions 54 a sufficient distance below the overhanging portion 22 of the table and in front of the vertical portion 21 to be conveniently reached and engaged by the operator's foot, as hereinafter described.

The guiding handle 17 is provided at its lower end with a lateral extension 60 in which is formed the hook 61 adapted to receive the bar 53 at the front end of the link 49 when the handle is in substantially vertical position as shown in Figs. 2 and 4.

The mode of operation of the link and handle to actuate the elevating mechanism is as follows: Assuming the parts are as shown in Figs. 2 and 4, that is with the truck body or table lowered, link raised, and the handle in substantially vertical position, the operator first places his foot upon either of the laterally projecting bars 54 at the front end of the link 49 and presses the link down against the tension of the spring 55. As the front end of the link descends, the spring becomes less effective owing to the changed angular position of the link, until it becomes inoperative altogether when the link is in final connected position with its front bar 53 in engagement with the hook 61 of the handle. Fig. 4 shows in full outline the position of the parts at this stage, the initial position of the link being shown in dotted outline.

Figure 6:
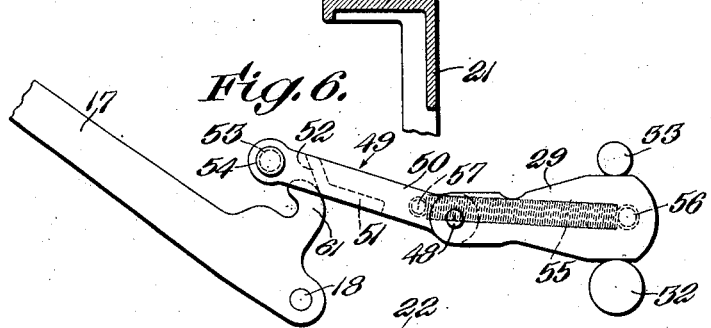

The operator now pulls down the guiding handle from its vertical position into the position shown in Figs. 3 and 5. This downwardly swinging movement of the handle acts to draw the link forwardly and with it the wedges, thus elevating the truck body or table. The position of the elevating parts at the completion of the elevating movement is shown in Figs. 3 and 5. The guiding handle in this movement has been lowered closer to the floor or ground than would be convenient for the operator in propelling and guiding the truck, and as he raises the handle to such guiding or propelling position, which is that shown in Fig. 6, the back face of the hook 61 engages the inclined face 52 of the cross-member 51 of the link and forces the front end of the link upwardly until, when the position shown in Fig. 6 is reached, the line of action of the spring 55 is far enough above the pivot 48 to render the spring operative to raise the link into the position shown in Fig. 7 and to retain it there, leaving the guiding handle free to be swung to the right or left and raised or lowered as the operator desires.

In order to relieve the inclined wedges of the tendency to move longitudinally when the truck body is in raised position, the wedges are provided at their rear ends with flat or horizontal faces 65 for the anti-friction rolls, the accidental movement of the wedges and the lowering of the truck body being prevented by means of a lock or latch 66 which is pivoted upon the bar 56 passing through the rear ends of the front wedges. This latch has the depending shoulders 67 adapted to engage the notches 68 in the side members 1 of the running gear of the truck. A releasing pedal 69 extends forwardly from one side of the latch in convenient position for the operator, the weight of the pedal, which tends to release the catch, being counter-balanced by counterweights 70.

In order to force the wedges rearwardly so that the truck body or table may be lowered, the latch member 66 is provided with an abutment arm 71 which, after the pedal has been depressed so that the shoulders 67 are freed from the notches 68, engages a roll 72 carried by the truck body or table between the two anti-friction rolls 33 on the cross-member 23. The roll 72 thereafter serves as an abutment for the arm 71 and the continued downward movement of the pedal 69 forces the wedges rearwardly to unseat the rolls to lower the truck body, the check 73 controlling the lowering movement. During this rearward movement of the wedge mechanism, the shoulders 67 ride along on top of the oblique members 1 of the running gear, and the pedal 69 is moved bodily to a position beneath the table or body. When the truck body is again elevated the lock or latch with its connected parts moves forward with the wedges until the shoulders 67 drop into the notches 68 when the pedal is in its forward position, as shown in Fig. 3, within easy reach of the operator.

In order to hold the handle 17 securely in upright position when not in use, the hub of the handle has been provided with a depression or recess 74 adapted to receive the rounded end 75 of a spring pressed plunger mounted in a recess in the forward end of the tongue 11. When the handle 17 is raised to vertical position the plunger 75 enters the recess 74 and holds the handle securely in upright position, as shown in Fig. 2. To release the handle it is only necessary to pull it forwardly thereby forcing the plunger out of the recess.

It will be observed that in my improved construction there is no tendency for the link to disengage from the hook of the handle if the operator removes his foot after once depressing the link. With the parts in this position the spring is inoperative and the link lies in the hook of the handle by reason of its own weight, and the parts will remain in this position as long as the operator desires. Thus the connection of the link and handle is made without the necessity of any movement of the handle, and may, if so desired, be effected long in advance of any downward movement of the handle.

It will also be noted that the disconnection of the link from the handle is initiated positively by the operator by the raising of the handle. It is not until the link has been positively forced upwardly a substantial distance and until the link is clear of the hook of the handle, that the spring becomes effective and completes the movement of the link to its normal inoperative position.

Having thus described the present invention, what is claimed is:

1. An elevating truck having, in combination, a carriage, an elevating table, means for raising the table on the carriage, a link pivoted on said means, a handle mounted to turn upon a horizontal axis, the handle and the free end of the link being provided with complemental surfaces for connecting the handle and link when the handle is lowered and for initiating a disconnecting movement of the link when the handle is raised, a tension spring secured at one end to the elevating mechanism and at the other to the link, the line of action of the spring passing substantially through the pivotal axis of the link whereby the spring is inoperative when the handle is first raised to impart a positive disconnecting movement to the link and until the line of action of the spring is carried a sufficient distance from the pivotal axis of the link to render the spring operative to complete the disconnecting of the link.

2. An elevating truck having, in combination, a carriage, an elevating table, means, including wedges, for raising the table upon the carriage, a guiding handle mounted to turn upon horizontal and vertical axes, said handle being provided with a hook, a link pivoted upon the wedges and provided at its free end with an engaging surface to engage the hook on the handle, a spring secured at one end to a wedge and at the other to the link and lying, when the handle is in lowered position and the link is connected thereto, substantially in the line of the pivotal axis of the link.

3. An elevating truck having, in combination, a carriage, an elevating table provided at its front end with an overhanging portion, mechanism for raising the table upon the carriage including a pivoted link, means for holding the free end of the link elevated when said link is out of operation, the front end of the table being provided with an abutment to engage the link when the table is in lowered position to hold the free end of the link partially depressed convenient for the operator and permitting the free end of the link to rise close under the overhanging portion of the table when the latter is in raised position.

4. An elevating truck having, in combination, a carriage, an elevating table, means, including wedges and rolls, for elevating the table upon the carriage, the wedges being provided with surfaces to be engaged by the rolls to hold the table in elevated position, a pivoted member pivotally connected with the wedges and provided with an actuating pedal and an abutment face, the table being provided with a cooperating abutment whereby when the pedal is actuated the wedges will be moved to carry said surfaces out of engagement with the rolls.

5. An elevating truck having, in combination, a carriage, an elevating table, means, including wedges and rolls, for elevating the table upon the carriage the wedges being provided with surfaces to be engaged by the rolls to hold the table in elevated position, a lock comprising a member pivotally connected with the wedges and movable longitudinally therewith, said member being provided with a locking face, an actuating pedal and an abutment face, the carriage being provided with a cooperating locking face and the table with a cooperating abutment whereby when the pedal is depressed the locking faces will be disengaged, and the abutment face will engage the abutment and the wedges will be actuated to carry the surfaces out of engagement with the rolls.

6. An elevating truck having, in combination, a carriage, an elevating table, means for elevating the table upon the carriage, a handle mounted to turn upon a horizontal axis and provided with a hook, a pivoted link for connecting the table elevating means to the handle, the link comprising two side members, a cross-bar connecting the ends of the members and adapted to be engaged by the hook on the handle, and a cross-member having an inclined face adapted to be engaged by the back of the hook when the handle is raised to thereby disconnect the cross-bar from the hook.

7. An elevating truck having, in combination, a carriage, an elevating table, mechanism intermediate the carriage and table for raising the table vertically upon the carriage, a lever pivoted upon the elevating mechanism and adapted to be actuated by the foot of the operator, the lever having a latching face to engage the carriage to lock the table in elevated position, and an abutment face to engage the table to initiate the reverse movement of the elevating mechanism.

8. An elevating truck having, in combination, a carriage, an elevating table, horizontally moving means for raising and lowering the table vertically upon the carriage, a lock for locking said means from horizontal movement, a pedal for releasing the lock and means connected with the pedal for positively initiating the horizontal movement of the raising and lowering means.

9. An elevating truck having, in combination, a carriage, an elevating table, a handle mounted to turn about a horizontal axis for raising the table upon the carriage including a link pivoted at one end and having provision at the other for connection with the handle, a tension spring having one end attached to a relatively fixed part and the other to the pivoted link in such a manner that the line of action of the spring is substantially in the line of the pivotal axis of the link when the link is connected to the handle both when the table has been lowered and the handle has been raised and also when the table has been raised and the handle has been lowered, the handle and link being provided with co-operating surfaces adapted to be engaged when the handle is being raised to impart a positive initial disconnecting movement to the link and to carry the line of action of the spring a sufficient distance from the pivotal axis to permit the spring to complete the disconnecting movement of the link.

BERNARD E. SCRIVEN.